(12) United States Patent
Rasmussen et al.

(10) Patent No.: US 7,556,858 B2
(45) Date of Patent: Jul. 7, 2009

(54) SUBSTRATE WITH ATTACHED DENDRIMERS

(75) Inventors: Jerald K. Rasmussen, Stillwater, MN (US); James I. Hembre, Plymouth, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 778 days.

(21) Appl. No.: 10/954,862

(22) Filed: Sep. 30, 2004

(65) Prior Publication Data

US 2006/0068204 A1    Mar. 30, 2006

(51) Int. Cl.
    B32B 5/16    (2006.01)

(52) U.S. Cl. ............... 428/403; 428/404; 428/405; 428/406; 428/407; 428/500

(58) Field of Classification Search ......... 428/403, 428/404–407, 500
    See application file for complete search history.

(56) References Cited

U.S. PATENT DOCUMENTS

| | | | |
|---|---|---|---|
| 2,101,107 A | 12/1937 | Strain | |
| 3,058,594 A | 10/1962 | Hultgren | |
| 4,153,661 A | 5/1979 | Ree et al. | |
| 4,485,236 A | 11/1984 | Rasmussen et al. | |
| 4,539,256 A | 9/1985 | Shipman | |
| 4,565,663 A | 1/1986 | Errede et al. | |
| 4,639,286 A | 1/1987 | Rasmussen et al. | |
| 4,810,381 A | 3/1989 | Hagen et al. | |
| 4,842,739 A | 6/1989 | Tang | |
| 4,871,824 A | 10/1989 | Heilmann et al. | |
| 4,957,943 A | 9/1990 | McAllister et al. | |
| 4,971,736 A | 11/1990 | Hagen et al. | |
| 5,081,197 A | 1/1992 | Heilmann et al. | |
| 5,149,806 A | 9/1992 | Moren et al. | |
| 5,171,264 A | 12/1992 | Merrill | |
| 5,268,473 A | 12/1993 | Moren et al. | |
| 5,292,514 A | 3/1994 | Capecchi et al. | |
| 5,336,742 A | 8/1994 | Heilmann et al. | |
| 5,344,701 A | 9/1994 | Gagnon et al. | |
| 5,403,902 A | 4/1995 | Heilmann et al. | |
| 5,408,002 A | 4/1995 | Coleman et al. | |
| 5,468,847 A | 11/1995 | Heilmann et al. | |
| 5,476,665 A | 12/1995 | Dennison | |
| 5,510,421 A | 4/1996 | Dennison et al. | |
| 5,561,097 A | 10/1996 | Gleason et al. | |
| 5,993,935 A | 11/1999 | Rasmussen et al. | |
| 6,063,484 A | 5/2000 | Exsted et al. | |
| 6,080,404 A | 6/2000 | Branham et al. | |
| 6,312,809 B1 | 11/2001 | Crooks et al. | |
| 6,448,301 B1 | 9/2002 | Gaddam et al. | |
| 6,448,337 B1 | 9/2002 | Gaddam et al. | |
| 6,548,607 B2 | 4/2003 | Halverson et al. | |
| 6,635,690 B2 | 10/2003 | Heilmann et al. | |
| 6,794,458 B2 | 9/2004 | Haddad et al. | |
| 7,101,621 B2 * | 9/2006 | Haddad et al. ............. 428/357 |
| 2002/0086160 A1 | 7/2002 | Qiu et al. | |
| 2003/0049435 A1 | 3/2003 | Haddad et al. | |
| 2003/0096908 A1 | 5/2003 | Heilmann et al. | |

FOREIGN PATENT DOCUMENTS

| | | |
|---|---|---|
| DE | 196 21 741 | 12/1997 |
| EP | 0 292 735 | 11/1988 |
| WO | WO97/39041 | * 2/1997 |
| WO | WO 97/39041 | 10/1997 |
| WO | WO 00/29373 | 5/2000 |
| WO | WO 01/70681 | 9/2001 |
| WO | WO 02/087551 | 11/2002 |
| WO | WO 2004/052943 | 6/2004 |

OTHER PUBLICATIONS

J.K. Rassmussen et al., Encyclopedia of Polymer Science and Engineering 2$^{nd}$ Edition, Polyazlactones, vol. 11, pp. 558-571, 1988.
Swali et al., J. Org. Chem. Solid-Phase Dendrimer Synthesis and the Generation of Super-High-Loading Resin Beads for Combinatorial Chemistry, vol. 62, pp. 4902-4903, 1997.
Beier et al., Nucleic Acids Research, Versatile Derivatisation of Solid Support Media for Covalent Bonding on DNA-microchips, vol. 27, No. 9, pp. 1970-1977, 1999.

* cited by examiner

*Primary Examiner*—Leszek Kiliman
(74) *Attorney, Agent, or Firm*—Dena M. Ehrich

(57) ABSTRACT

Articles and methods of making articles are provided. The articles have a dendrimeric material attached to a substrate. The dendrimeric material, an attachment group connecting the dendrimeric material to the substrate, or both the dendrimeric material and the attachment group can be formed by a ring-opening reaction of an azlactone group with a nucleophilic group such as a hydroxyl group, primary amino group, or secondary amino group.

15 Claims, No Drawings

SUBSTRATE WITH ATTACHED DENDRIMERS

BACKGROUND

Dendrimeric materials with a three-dimensional, spherical shape are known in the art. Such materials can be prepared using a divergent process or a convergent process. In a divergent process, the dendrimeric material is prepared by building the structure from a central core. In a convergent process, individual branches are connected together to form the dendrimeric material.

There are few examples of dendrimeric material covalently bonded to a substrate. These articles are usually prepared by adhering a previously prepared dendrimeric material to a substrate.

SUMMARY OF THE INVENTION

Articles are provided that include a substrate with an attached dendrimeric material. The resulting dendrimeric structure usually has reactive end groups that can function, for example, as ion exchange sites or affinity capture sites. The dendrimeric structure, which can be formed and extended using a divergent process from the surface of the substrate, can be used for separation or purification of one or more compounds from a mixture.

In a first aspect, methods are provided for making an article that has a dendrimeric structure. In one method, an article is prepared by providing an azlactone-functional substrate; reacting an azlactone group on the substrate with a first nucleophilic compound having multiple nucleophilic groups selected from hydroxyl groups, primary amino groups, secondary amino groups, or a combination thereof to form a substrate-attached nucleophilic compound having at least one nucleophilic end group; and then reacting the nucleophilic end group of the substrate-attached nucleophilic compound with a first azlactone compound having multiple azlactone groups to form a first dendrimeric structure having azlactone end groups. To form a dendrimeric structure, the first nucleophilic compound has at least 3 nucleophilic groups, the first azlactone group has at least 3 azlactone groups, or a combination thereof. The azlactone-functional substrate is according to Formula III.

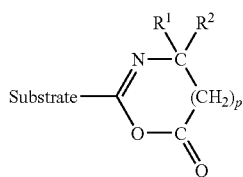

III

In Formula III, p is an integer of 0 or 1; and $R^1$ and $R^2$ independently are selected from an alkyl, heteroalkyl, aryl, aralkyl, or $R^1$ and $R^2$ taken together with a carbon atom to which they are attached form a carbocyclic ring. Although Formula III shows only one azlactone group attached to the substrate for ease of description, multiple azlactone groups are typically attached to the substrate.

In another method, an article is prepared by providing a substrate having attached nucleophilic groups selected from hydroxyl groups, primary amino groups, secondary amino groups, or a combination thereof; reacting the nucleophilic group attached to the substrate with a first azlactone compound having multiple azlactone groups to form a substrate-attached azlactone compound having at least one azlactone end group; and then reacting the azlactone end group of the substrate-attached azlactone compound with a first nucleophilic compound having multiple nucleophilic groups selected from a hydroxyl group, primary amino group, secondary amino group, or a combination thereof to form a first dendrimeric structure having nucleophilic end groups. To form a dendrimeric structure, the first azlactone compound has at least 3 azlactone groups, the first nucleophilic compound has at least 3 nucleophilic groups, or a combination thereof.

In yet another method, an article is prepared by providing an azlactone-functional substrate according to Formula III and then reacting an azlactone group attached to the substrate with a dendrimeric material having a nucleophilic group selected from a hydroxyl group, primary amino group, secondary amino group, or a combination thereof.

Another aspect provides articles that have a dendrimeric structure. Such articles include a substrate, a dendrimeric material having an extension group, and an attachment group for bonding the dendrimeric material to the substrate. The extension group is according to Formula XXV

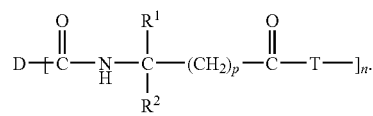

XXV

In Formula XXV, n is an integer of at least 2; p is an integer of 0 or 1; T is oxy or $NR^b$ where $R^b$ is selected from hydrogen, alkyl, heteroalkyl, aryl, or aralkyl; $R^1$ and $R^2$ independently are selected from an alkyl, heteroalkyl, aryl, aralkyl, or $R^1$ and $R^2$ taken together with a carbon atom to which they are attached form a carbocyclic ring; and D is a linking group with a valence equal to n that contains at least one carbon atom.

Other articles include a substrate, a dendrimeric material, and a divalent attachment group connecting the dendrimeric material to the substrate. The attachment group is of Formula II

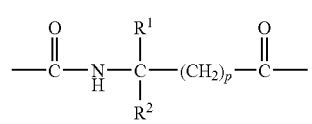

II wherein p is an integer of 0 or 1; and $R^1$ and $R^2$ independently are selected from an alkyl, heteroalkyl, aryl, aralkyl, or $R^1$ and $R^2$ taken together with a carbon atom to which they are attached form a carbocyclic ring.

The above summary of the present invention is not intended to describe each disclosed embodiment or every implementation of the present invention. The detailed description that follows more particularly exemplifies these embodiments.

DETAILED DESCRIPTION OF THE INVENTION

Articles and methods of making articles are provided. The articles have a dendrimeric material attached to a substrate.

The dendrimeric material, an attachment group connecting the dendrimeric material to the substrate, or both the dendrimeric material and the attachment group can be formed by a ring-opening reaction of an azlactone group with a nucleophilic group such as a hydroxyl group, primary amino group, or secondary amino group.

Definitions

As used herein, the terms "a", "an", and "the" are used interchangeably with "at least one" to mean one or more of the elements being described.

As used herein, the term "attachment group" refers to a divalent group that links a dendrimeric material to a substrate.

As used herein the term "dendrimeric material" refers to a three-dimensional chemical moiety that has at least one branching group.

As used herein, the term "dendrimeric structure" refers to an article that includes a substrate and a dendrimeric material attached to the substrate.

As used herein, the term "branching group" refers to a group that divides a molecular chain into at least two molecular chains in a dendrimeric material or dendrimeric structure.

As used herein, the term "extension group" refers to a group that extends a molecular chain in a dendrimeric material or dendrimeric structure. The extension groups are formed, for example, by reacting an end group of one dendrimeric material or dendrimeric structure with a compound to extend the length of a molecular chain. Some extension groups are branching groups (i.e., the molecular chains are both lengthened and branched).

As used herein, the term "end group" refers to a group located at the end of a dendrimeric material or dendrimeric structure. In some embodiments, the end group is capable of undergoing further chemical reactions. Suitable end groups include, but are not limited to, azlactone groups, hydroxyl groups, primary amino groups, secondary amino groups, acid groups, and the like.

As used herein, the term "azlactone group" or "Az" refers to a monovalent group of Formula I

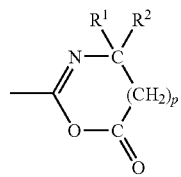

I where p is an integer of 0 or 1; and $R^1$ and $R^2$ are each independently selected from hydrogen, alkyl, heteroalkyl, aryl, aralkyl, or $R^1$ and $R^2$ taken together with a carbon atom to which they are attached form a carbocyclic ring.

As used herein, the term "polymer" refers to a polymeric material that is a homopolymer (i.e., a polymeric material that is the reaction product of one monomer) or a copolymer (i.e., a polymeric material that is the reaction product of at least two different monomers).

As used herein, the term "alkyl" refers to a monovalent hydrocarbon group that is saturated and that has 1 to 18 carbon atoms. The alkyl group can be linear, branched, or cyclic. In some examples, the alkyl group is linear or branched and has 1 to 12 carbon atoms, 1 to 10 carbon atoms, 1 to 6 carbon atoms, or 1 to 4 carbon atoms. In other examples, the alkyl is cyclic and has 3 to 12 carbon atoms. Some exemplary cycloalkyl groups have 3 to 10, 3 to 6, or 4 to 6 carbon atoms.

As used herein, the term "heteroalkyl" refers to a monovalent group that is saturated and has at least two carbon atoms separated by at least one catenary heteroatom selected from O, S, or $NR^b$ where $R^b$ is hydrogen, alkyl, heteroalkyl, aryl, or aralkyl. The heteroalkyl group can be linear, branched, or cyclic. In some examples, the heteroalkyl group has 2 to 18 carbon atoms and 1 to 6 heteroatoms, 2 to 12 carbon atoms and 1 to 5 heteroatoms, 2 to 10 carbon atoms and 1 to 4 heteroatoms, 2 to 8 carbon atoms and 1 to 3 heteroatoms, or 2 to 6 carbon atoms and 1 to 2 heteroatoms.

As used herein, the term "aryl" refers to both heterocyclic and carbocyclic aromatic groups. An aryl can have one or more connected or fused rings. Some exemplary aryl groups have a 5 to 12 membered ring structure with 0 to 3 heteroatoms selected from O, S, or $NR^b$ where $R^b$ is hydrogen, alkyl, heteroalkyl, aryl, or aralkyl.

As used herein, the term "aralkyl" refers to an alkyl group that is substituted with an aryl group.

As used herein, the term "azlactone compound" refers to a compound having at least one azlactone group. Some azlactone compounds have multiple azlactone groups such as 2 to 10, 3 to 10, 2 to 8, 3 to 8, 2 to 6, 3 to 6, 2 to 4, or 3 azlactone groups.

As used herein, the term "nucleophilic group" refers to a hydroxyl group, primary amino group, or secondary amino group.

As used herein, the term "nucleophilic compound" refers to a compound having at least one nucleophilic group. Some nucleophilic compounds have multiple nucleophilic groups such as 2 to 10, 3 to 10, 2 to 8, 3 to 8, 2 to 6, 3 to 6, 2 to 4, or 3 nucleophilic groups.

As used herein, the term "hydroxyl" refers to a monovalent group of formula —OH.

As used herein, the term "oxy" refers to a divalent group of formula —O—.

As used herein, the term "primary amino group" refers to a monovalent group of formula —$NH_2$.

As used herein, the term "secondary amino group" refers to a monovalent group of formula —$NHR^a$ where $R^a$ is alkyl, heteroalkyl, aryl, or aralkyl.

As used herein, the term "azlactone-functional substrate" refers to a substrate that has covalently attached azlactone groups capable of reacting with a nucleophilic group.

As used herein, the term "$Az^1$" refers to an azlactone group that has undergone a ring opening reaction. The $Az^1$ group is a divalent group of Formula II

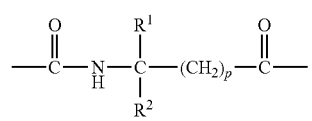

II where p is an integer of 0 or 1; and $R^1$ and $R^2$ are each independently selected from hydrogen, alkyl, heteroalkyl, aryl, aralkyl, or $R^1$ and $R^2$ taken together with a carbon atom to which they are attached form a carbocyclic ring.

Methods of Making Articles

Methods are provided for making articles that include a substrate, a dendrimeric material, and an attachment group covalently bonding the dendrimeric material to the substrate.

The dendrimeric material, the attachment group, or both can be formed using a ring-opening reaction of an azlactone group with a nucleophilic group.

In a first aspect, an article is prepared by reacting an azlactone group on an azlactone-functional substrate with a first nucleophilic compound having multiple nucleophilic groups to form a substrate-attached nucleophilic compound having at least one nucleophilic end group; and reacting the nucleophilic end group of the substrate-attached nucleophilic compound with a first azlactone compound having multiple azlactone groups to form a first dendrimeric structure having azlactone end groups. To form a dendrimeric structure, at least one of the first azlactone compounds or the first nucleophilic compounds has at least 3 reactive groups.

An azlactone-functional substrate can be depicted by Formula III

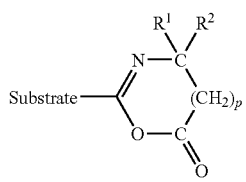

III where p is an integer of 0 or 1; and $R^1$ and R independently are selected from an alkyl, heteroalkyl, aryl, aralkyl, or $R^1$ and $R^2$ taken together with a carbon atom to which they are attached form a carbocyclic ring. Formula III can be denoted as "Substrate-Az" in the reactions and formulas below. Although Formula III shows only one azlactone group attached to the substrate for ease of description, multiple azlactone groups are typically attached to the substrate.

In some embodiments of Formula III, an alkyl group has 1 to 18 carbon atoms, 1 to 12 carbon atoms, 3 to 12 carbon atoms, 1 to 10 carbon atoms, 3 to 10 carbon atoms, 1 to 6 carbon atoms, 3 to 6 carbon atoms, or 1 to 4 carbon atoms; a heteroalkyl group has 2 to 18 carbon atoms and 1 to 6 heteroatoms, 2 to 12 carbon atoms and 1 to 5 heteroatoms, 2 to 10 carbon atoms and 1 to 4 heteroatoms, 2 to 8 carbon atoms and 1 to 3 heteroatoms, or 2 to 6 carbon atoms and 1 to 2 heteroatoms; an aryl group has 2 to 12 carbon atoms and 0 to 3 heteroatoms, 3 to 12 carbon atoms and 0 to 2 heteroatoms, or 4 to 12 carbon atoms and 0 to 1 heteroatoms; an aralkyl group has 3 to 15 carbon atoms and 0 to 3 heteroatoms, 4 to 15 carbon atoms and 0 to 2 heteroatoms, or 5 to 15 carbon atoms and 0 to 1 heteroatom; and a carbocyclic ring has 5 to 12 carbon atoms, 5 to 10 carbon atoms, or 5 to 8 carbon atoms. Suitable heteroatoms include O, S, or $NR^b$ where $R^b$ is hydrogen, alkyl, heteroalkyl, aryl, or aralkyl.

In some exemplary azlactone-functional substrates according to Formula III, p is equal to 0 (i.e., the azlactone group is a five membered ring) and both $R^1$ and $R^2$ are alkyl groups. In a more specific example, p is equal to 0 and both $R^1$ and $R^2$ are methyl groups.

To attach a dendrimeric material to an azlactone-functional substrate (i.e., Substrate-Az or Formula III in Reaction Scheme A), the azlactone groups on the surface of a substrate can be reacted with a first nucleophilic compound $Q(TH)_r$. In formula $Q(TH)_r$, r is an integer greater than or equal to 2; TH is a nucleophilic group selected from a hydroxyl group or an amino group of formula $-NHR^b$ where $R^b$ is selected from hydrogen, alkyl, heteroalkyl, aryl, or aralkyl; and Q is the residual of the first nucleophilic compound with a valence equal to r. Q is that portion of the first nucleophilic compound that is not a nucleophilic group and often contains at least two carbon atoms. The reaction of one of the nucleophilic groups of the first nucleophilic compound $Q(TH)_r$ with an azlactone-functional substrate (i.e., Substrate-Az) results in an opening of the azlactone ring and the formation of a substrate-attached nucleophilic compound (i.e., Substrate-$Az^1$-T-$Q(TH)_{r-1}$ or Formula IV) as shown in Reaction Scheme A. Although an azlactone-functional substrate typically has multiple attached azlactone groups, only one group is shown in the following formulas for ease of description.

Reaction Scheme A

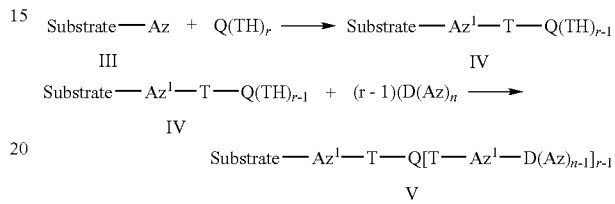

In Reaction Scheme A, the term $Az^1$ refers to an azlactone group that has undergone a ring opening reaction. The divalent group $Az^1$ in Formula IV that is attached to the substrate functions as an attachment group of the fist nucleophilic compound $Q(TH)_r$ to the substrate. The attachment group is of Formula II:

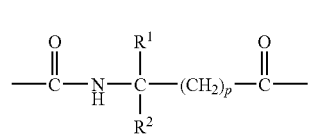

II

Groups $R^1$ and $R^2$ independently are selected from an alkyl, heteroalkyl, aryl, aralkyl, or $R^1$ and $R^2$ taken together with a carbon atom to which they are attached form a carbocyclic ring; and p is an integer equal to 0 or 1. One of the carbonyl groups is usually attached to the substrate and the other carbonyl group is often attached to a divalent group such as oxy or $NR^b$ where $R^b$ is hydrogen, alkyl, heteroalkyl, aryl, or aralkyl.

The substrate-attached nucleophilic compound of Formula IV can be reacted with a first azlactone compound having multiple azlactone groups to form a first dendrimeric structure of Formula V. The first azlactone compound is of formula $D(Az)_n$ where n is an integer equal to at least 2. To provide a dendrimeric structure, at least one of the first nucleophilic compound or the first azlactone compound has at least three reactive groups. That is, the first nucleophilic compound has at least 3 nucleophilic groups, the first azlactone compound has at least 3 azlactone groups, or a combination thereof.

Nucleophilic compounds that can be used to form and extend the dendrimeric structures have at least two nucleophilic groups. As used herein, the formula $Q(TH)_r$ is used for a first nucleophilic compound, the formula $Q^1(TH)_r$ is used for a second nucleophilic compound, and the formula $Q^2(TH)_r$ is used for a third nucleophilic compound. The first, second, third, and other nucleophilic compounds can be the same or different. In these formulas for nucleophilic compounds, r is an integer equal to at least 2 and the groups Q, $Q^1$, and $Q^2$ denote that portion of the nucleophilic compound that is not a nucleophilic group. The groups Q, $Q^1$, and $Q^2$ have a valence equal to r and often have at least 2 carbon atoms. Typically, the nucleophilic compounds have 2 to 10, 2 to 8, 2 to 6, 2 to 4, or 3 nucleophilic groups. The use of a nucleophilic compound having three or more nucleophilic groups results in the formation of a branching site in the dendrimeric structure.

Suitable nucleophilic compounds having two amino groups include, but are not limited to, ethylenediamine, N-methylethylenediamine, piperazine, N-(2-aminoethyl)-piperazine, 1,3-propanediamine, 1,4-butanediamine, benzenediamines, 1,4-cyclohexanediamine, 1,6-hexanediamine, hydrazine (e.g., where Q is a single bond), and hydrazine derivatives (e.g., adipic dihydrazide). Suitable nucleophilic compounds having three amino groups include, but are not limited to, tris(2-aminoethyl)amine, bis-(2-aminoethyl) amine (diethylenetriamine), tris-N,N',N''-(isopropyl-2-aminoethyl)amine, 1,3,5-benzenetriamine, and 1,3,5-cyclohexanetriamine. Nucleophilic compounds containing more than three amino groups include triethylenetetramine, tetraethylenepentamine, pentaethylenehexamine, cyclen (1,4,7,10-tetraazacyclododecane), cyclam (1,4,8,11-tetraazacyclotetradecane), and hexacyclen (1,4,7,10,13,16-hexaazacyclooctadecane).

Suitable nucleophilic compounds having multiple hydroxyl groups include, but are not limited to, ethyleneglycol, diethyleneglycol, triethyleneglycol, 1,2-propanediol, 1,3-propanediol, 1,2-butanediol, 1,3-butanediol, 1,4-butanediol, glycerol, trimethylolpropane, pentaerythritol, di-hydroxybenzene, trihydroxybenzene, 2,2'-thiodiethanol, bisphenol A, triethanolamine, and tetramethylene bishydroxamic acid.

Nucleophilic compounds containing both amino groups and hydroxyl groups include, but are not limited to, 2-hydroxyethylamine, 3-hydroxypropylamine, 1,3-diamino-2-hydroxypropane, 1,2-dihydroxy-3-aminopropane, 1-hydroxy-6-aminohexane, bis-(2-hydroxyethyl)amine, diglycolamine, 1-amino-3,5-dihydroxycyclohexane, 1-amino-3,5-dihydroxybenzene, N,N'-bis(2-hydroxyethyl)piperazine, N-hydroxyethylpiperazine, 2-aminoethanol, 3-aminopropanol, 4-aminobutanol, hydroxylamine, and 2-amino-2-methyl-2,3-propanediol.

Some nucleophilic compounds are biologically active compounds. As used herein, the term "biologically active compound" refers to a material that is active in a biological, immunological, physiological, or pharmaceutical manner. When biologically active compounds are used as the nucleophilic compounds, the dendrimeric structures are typically not further extended by reaction with another azlactone compound. Suitable biologically active compounds include, but are not limited to, antibodies, antigens, enzymes, cofactors, inhibitors, lectins, hormones, receptors, coagulation factors, proteins, peptides, DNA fragments, RNA fragments, histones, vitamins, pharmaceuticals, cell surface markers, and the like.

Azlactone compounds that can be used to form and extend the dendrimeric structure include those having at least two azlactone groups. As used herein, the formula $D(Az)_n$ can be used for a first azlactone compound, the formula $D^1(Az)_n$ can be used for a second azlactone compound, and the formula $D^2(Az)_n$ can be used for a third azlactone compound. The first, second, third, and other azlactone compounds can be the same or different. In these formulas for azlactone compounds, n is an integer equal to at least 2 and the groups D, $D^1$, and $D^2$ denote that portion of the azlactone compound that is not an azlactone group. The groups D, $D^1$, and $D^2$ have at least one carbon atom and a valence equal to n. Often, the azlactone compounds have 2 to 10, 2 to 8, 2 to 6, 2 to 4, or 3 azlactone groups. The use of an azlactone compound having 3 or more azlactone groups results in the formation of a branching site in the dendrimeric structure.

Suitable azlactone compounds having multiple azlactone groups are further described in U.S. Pat. No. 4,485,236 (Rasmussen et al.); U.S. Pat. No. 5,268,473 (Moren et al.); U.S. Pat. No. 5,149,806 (Moren et al.); U.S. Pat. No. 5,081,197 (Heilmann et al.); and U.S. Pat. No. 5,292,514 (Capecchi et al.), the disclosures of which are all incorporated herein by reference.

Exemplary azlactone compounds that have two azlactone groups include, but are not limited to, 1,2-bis[2-(4,4-dimethyl-2-oxazolin-5-one-2-yl)ethylthio]ethane; 1,5-bis[2-(4,4-dimethyl-2-oxazolin-5-one-2-yl)ethylthio]-3-oxapentane; 1,10-bis[2-(4,4-dimethyl-2-oxazolin-5-one-2-yl)ethylthio]-4,7-dioxadecane-3,8-dione; 1,5-bis[2-(4,4-dimethyl-2-oxazolin-5-one-2-yl)-2-methylethylthio]-3-oxapentane; 1,5-bis[2-(4,4-dimethyl-2-oxazolin-5-one-2-yl)ethylthio]-3-oxapentane; 1,5-bis[2-(4,4-dimethyl-2-oxazolin-5-one-2-yl)ethylthio]-3-thiapentane; 1,5-bis[2-(4,4-dimethyl-2-oxazolin-5-one-2-yl)ethyl-N-methylamino]-3-oxapentane; α,ω-bis[5-(4,4-dimethyl-2-oxazolin-5-one-2-yl)ethylthio]-3-aza-3-(2-cyanoethyl)-2-methylpentyl]poly(oxypropylene); and 1,8-bis[2-(4,4-dimethyl-2-oxazolin-5-one-2-yl)ethylthio]-3,6-dioxaoctane-2,7-dione.

Exemplary azlactone compounds that have three azlactone groups include, but are not limited to,

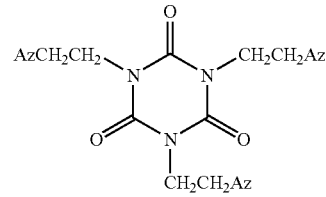

such as 1,3,5-tris[2-(4,4-dimethyl-2-oxazolin-5-one-2-yl)ethyl]ltriazin-2,4,6-trione;

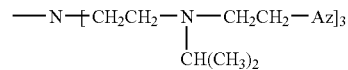

such as tris[[2-[N-2-(4,4-dimethyl-2-oxazoline-5-one-2-yl)ethyl-N-isopropyl]-2-amino]ethyl]amine;

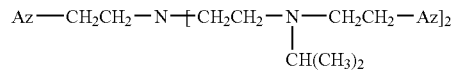

such as N,N',N''-tris2-(4,4-dimethyl-2-oxazoline-5-one-2-yl)ethyl-bis-(N,N''-isopropyl-2-aminoethyl)amine;

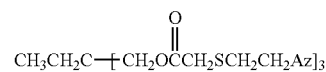

such as 1,1,1-tris[[2-[2-(4,4-dimethyl-2-oxazolin-5-one-2-yl)ethylthio]methylcarbonyloxymethyl]]propane;

such as 1,1,1-tris[[2-[2-(4,4-dimethyl-2-oxazolin-5-one-2-yl) ethylthio]ethyl carbonyloxymethyl]]propane; and

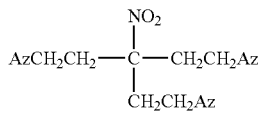

such as tris-[2-(4,4-dimethyl-2-oxazolin-5-one-2-yl)ethyl] nitromethane.

Exemplary azlactone compounds having four azlactone groups include, but are not limited to,

such as tetrakis-[[2-[2-(4,4-dimethyl-2-oxazolin-5-one-2-yl) ethylthio]ethylcarbonyloxymethyl]]methane; and

such as tetrakis-[[2-[2-(4,4-dimethyl-2-oxazolin-5-one-2-yl) ethylthio]methylcarbonyloxymethyl]]methane.

As a result of Reaction Scheme A, the number of azlactone groups attached to the substrate can be increased (i.e., the azlactone end groups in Formula V are indirectly attached to the substrate). The theoretical number of azlactone end groups on the article (i.e., dendrimeric structure) according to Formula V that originate from one azlactone group on the surface of the substrate is equal to the product $(r-1)(n-1)$. For example, where the first nucleophilic compound has two nucleophilic groups (i.e., $Q(TH)_2$) and the first azlactone compound has three azlactone groups (i.e., $D(Az)_3$), the first dendrimeric structure of Formula V can have two azlactone end groups originating from a single azlactone group on the surface of the substrate. Such a structure is shown schematically in Formula X:

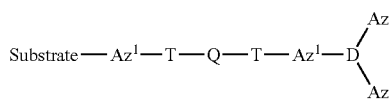

Where the first nucleophilic compound has three nucleophilic groups (i.e., $Q(TH)_3$) and the first azlactone compound has three azlactone groups (i.e., $D(Az)_3$), the first dendrimeric structure can have 4 azlactone end groups originating from a single azlactone group on the surface of the substrate. Such a dendrimeric structure is shown schematically in Formula XI:

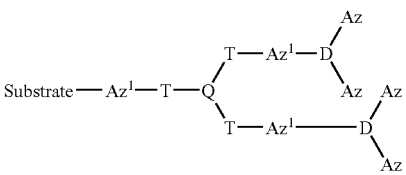

The first dendrimeric structure with azlactone end groups (e.g., Formulas X and XI) can be further extended by reaction with a second nucleophilic compound $Q^1(TH)_r$ having multiple nucleophilic groups to form a second dendrimeric structure having nucleophilic end groups. For example, a dendrimeric structure having four nucleophilic end groups for each attachment group (i.e, there are four nucleophilic end groups originating from a single azlactone group on the surface of the substrate) can be formed by reacting the first dendrimeric structure of Formula XI with a second nucleophilic compound of formula $Q^1(TH)_2$. Such a second dendrimeric structure is shown in Formula XII.

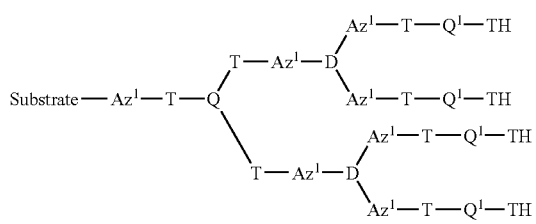

Likewise, a second dendrimeric structure formed by reacting the first dendrimeric structure of Formula X with a second nucleophilic compound of formula $Q^1(TH)_2$ can have two nucleophilic end groups originating from a single azlactone group on the surface of the substrate.

Reacting a dendrimeric structure having azlactone end groups with a nucleophilic compound having two nucleophilic groups extends the dendrimeric structure but does not increase the branching of the dendrimeric material. However, if the first dendrimeric structure is extended by a reaction with a nucleophilic compound that has at least three nucleophilic groups, the resulting second dendrimeric structure has a higher degree of branching than the first dendrimeric structure.

A dendrimeric structure having 8 nucleophilic groups for each attachment group can be formed by reacting the first dendrimeric structure of Formula XI with a second nucleophilic compound of formula $Q^1(TH)_3$. Such a dendrimeric structure is shown in Formula XIII.

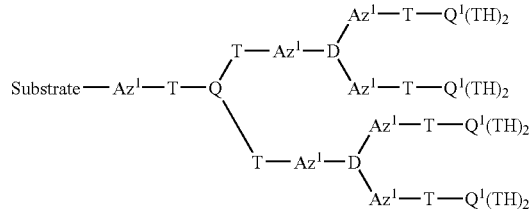

Likewise, a second dendrimeric structure formed by reacting a first dendrimeric structure of Formula X with a second nucleophilic compound of formula $Q^1(TH)_3$ can have four nucleophilic groups originating from a single azlactone group on the surface of the substrate. The first nucleophilic compound can be the same or different than the second nucleophilic compound.

Alternatively, the first dendrimeric structure with azlactone end groups (e.g., Formulas X and XI) can be further extended by reaction with a multi-functional compound having a first functional group selected from a nucleophilic group and a second functional group containing an acidic group. The multi-functional compound can be represented by the formula $M(TH)_x(G)_y$ where G is an acidic group; TH is a nucleophilic group selected from a hydroxyl group, primary amino group, or secondary amino group; x is an integer greater than or equal to 1; y is an integer greater than or equal to 1; and M represent the residual of the multi-functional compound (i.e., that part of the compound that is not a nucleophilic group or an acidic group). The group M has at least one carbon atom and a valence equal to the sum of x and y. Suitable acid end groups can be selected from a carboxylic acid, phosphonic acid, sulfonic acid, or salts thereof. The nucleophilic groups of the multi-functional compound react with the azlactone groups of the first dendrimeric structure resulting in the opening of the azlactone rings and the formation of a second dendrimeric structure having acidic end groups. For example, if the first dendrimeric structure of Formula XI is reacted with multi-functional compound having one nucleophilic group and one acidic group (i.e., M(TH)(G)), Formula XIVa depicts the resulting second dendrimeric structure.

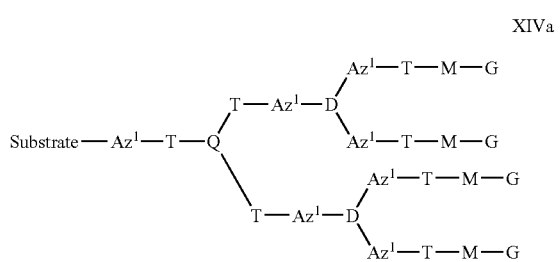

XIVa

Suitable multi-functional compounds of formula $M(TH)_x(G)_y$ include amino acids such as glycine, alanine, lysine, leucine, isoleucine, phenylalanine, tyrosine, proline, aspartic acid, glutamic acid, taurine, 2-aminoethylphosphonic acid, glutamine, and the like; and hydroxy acids such as hydroxyethanesulfonic acid, 3-hydroxypropionic acid, 6-hydroxyhexanoic acid, glyceric acid, glycolic acid, N-phosphonomethylglycine, and the like.

As another alternative, the second dendrimeric structure with azlactone end groups (e.g., Formulas X and XI) can be further reacted with an end capping compound of formula J(TH) where TH is a nucleophilic group selected from a hydroxyl group, primary amino group, or secondary amino group; and J is the residue of the end capping compound (i.e., J is that part of the end capping compound exclusive of the nucleophilic group). For example, if the first dendrimeric structure of Formula XI is reacted with such an end capping compound, Formula XIVb depicts the resulting second dendrimeric structure.

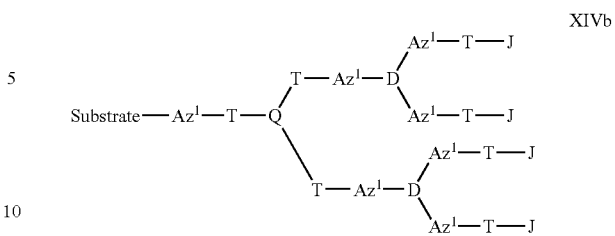

XIVb

The dendrimeric structure of Formula XIVb, formed by a ring opening reaction of an azlactone group with an end capping compound, is usually not further extended by subsequent reaction with another azlactone compound. The nucleophilic group of the end capping group J(TH) is used to covalently attach the end capping compound to the dendrimeric structure and the residue J often provides another function. For example, the end capping compound of formula J(TH) can be a dye, a catalyst, or a reagent. That is, the resulting dendrimeric structure has an attached dye, catalyst, or reagent. Alternatively, the attached end capping compound can be a ligand useful for chromatographic separations. If J contains a tertiary amino group, the attached end capping compound can function as a ligand for anion exchange separations. If J contains an alkyl or aryl group, the attached end capping compound can provide a ligand for hydrophobic interaction separations. If J contains a group that has an affinity for biomacromolecules, the attached end capping compound can provide a ligand for affinity separations.

A second dendrimeric structure with nucleophilic end groups (e.g., Formula XII or Formula XIII) can be further extended by reaction with a second azlactone compound $D^1(Az)_n$ having multiple azlactone groups to form a third dendrimeric structure having azlactone end groups. For example, if the second dendrimeric structure of Formula XII is reacted with a second azlactone compound $D^1(Az)_3$ having three azlactone groups, the following third dendrimeric structure shown in Formula XV can be formed.

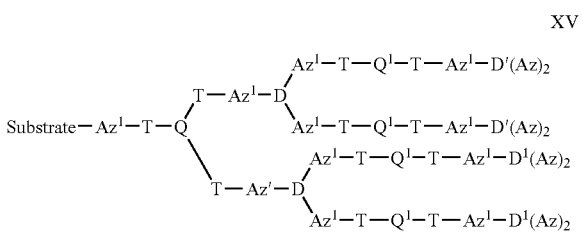

XV

That is, one azlactone group on the substrate can be used to prepare a dendrimeric structure with eight azlactone end groups. The second azlactone compound can be the same or different than the first azlactone compound.

The third dendrimeric structure with azlactone end groups (e.g., Formula XV) can be further extended by reacting the azlactone end groups with a third nucleophilic compound $Q^2(TH)_r$ having multiple nucleophilic groups to form a fourth dendrimeric structure having nucleophilic end groups. For example, the third dendrimeric structure of Formula XV can be reacted with a nucleophilic compound $Q^2(TH)_2$ having two nucleophilic groups to form a fourth dendrimeric structure of Formula XVI with nucleophilic end groups.

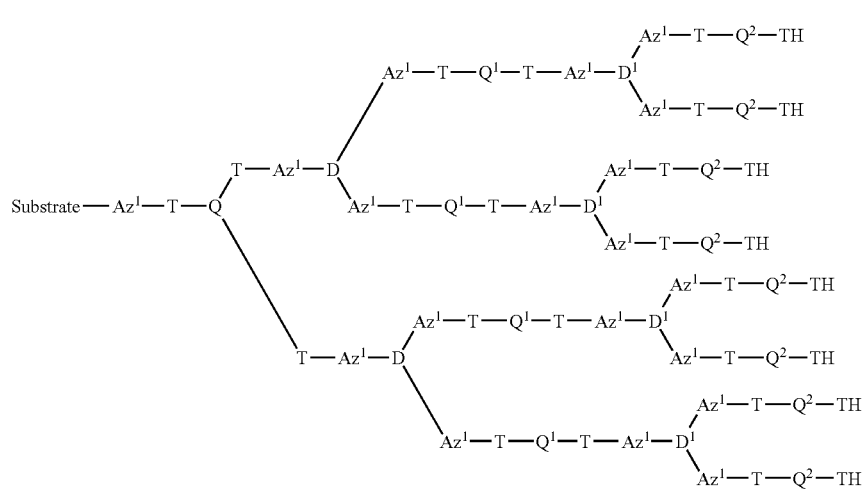

XVI

The fourth dendrimeric structure (e.g., Formula XVI) having nucleophilic groups can be further extended by reaction with a third azlactone compound $D^2(Az)_n$ having multiple azlactone groups to form a fifth dendrimeric structure having azlactone end groups. The fifth dendrimeric structure can be further extended by reaction of the azlactone end groups with a fourth nucleophilic compound having multiple nucleophilic groups to form a sixth dendrimeric structure with nucleophilic end groups. Additional dendrimeric structures can be prepared by successively reacting nucleophilic end groups with an azlactone compound having multiple azlactone groups to form a dendrimeric structure with azlactone end groups, reacting the azlactone end groups with a nucleophilic compound having multiple nucleophilic groups to form a dendrimeric structure with nucleophilic end groups, and repeating.

Alternatively, the third dendrimeric structure with azlactone end groups (e.g., Formula XV) can be further extended by reacting the azlactone end groups with a multi-functional compound $M(TH)_x(G)_y$ as defined above For example, if the third dendrimeric structure of Formula XV is reacted with a multi-functional compound $M(TH)(G)$ having one nucleophilic group and one acidic group G, the resulting fourth dendrimeric structure can be represented by Formula XVIIa.

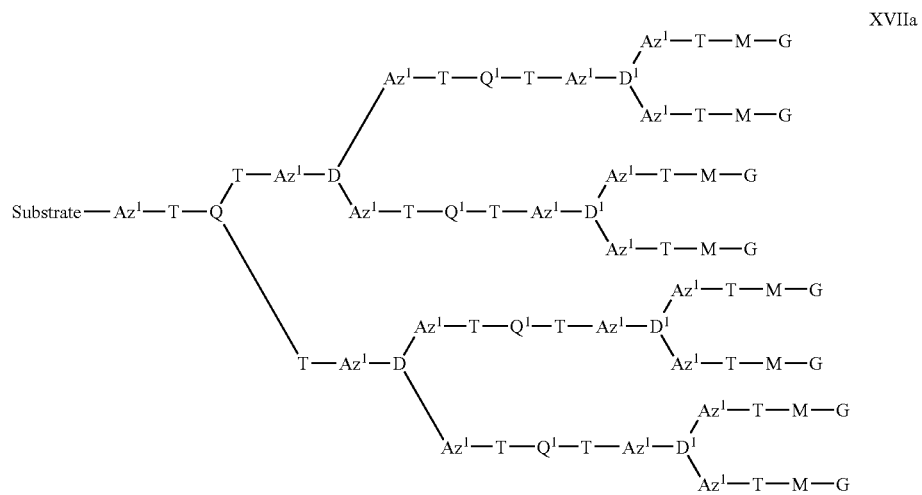

XVIIa

As another alternative, the third dendrimeric structure with azlactone end groups (e.g., Formula XV) can be further extended by reacting the azlactone end groups with an end capping compound of formula J(TH) as defined above. For example, if the third dendrimeric structure of Formula XV is reacted with a nucleophilic material of formula J(TH), the resulting fourth dendrimeric structure can be represented by Formula XVIIb.

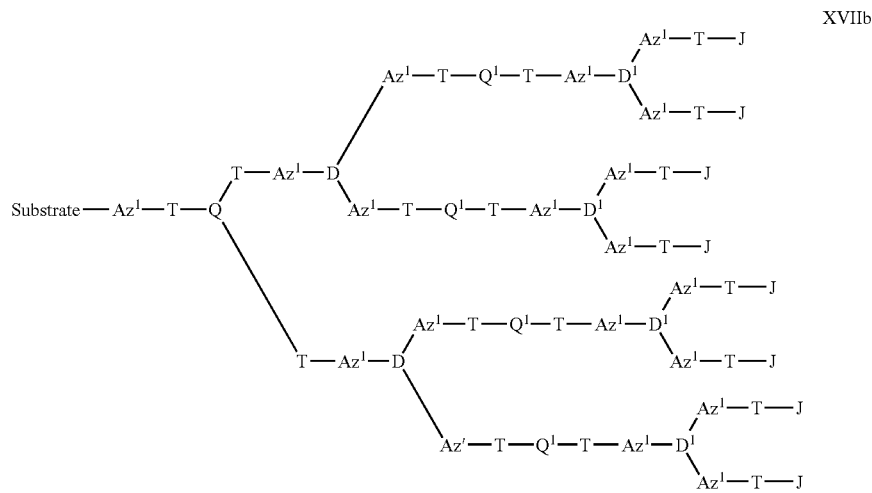

XVIIb

Any of the dendrimeric structures having azlactone end groups (e.g., the first dendrimeric structure of Formulas X or XI and the third dendrimeric structure of Formula XV) can be further extended by reacting an azlactone end group with a previously prepared dendrimeric material that contains nucleophilic groups.

Exemplary dendrimeric material that have primary or secondary amino end groups include, but are not limited to, those formed from polyamidoamine (PAMAM) and polypropylenimine. Dendrimeric material formed from PAMAM are commercially available under the trade designation "STARBURST (PAMAM) DENDRIMER" (e.g., Generation 0 with 4 primary amino groups, Generation 1 with 8 primary amino groups, Generation 2 with 16 primary amino groups, Generation 3 with 32 primary amino groups, and Generation 4 with 64 primary amino groups) from Aldrich Chemical, Milwaukee, Wis. Dendrimeric material formed from polypropylenimine is commercially available under the trade designation "DAB-AM" from Aldrich Chemical. For example, DAB-Am-4 is a generation 1 polypropylenimine tetraamine dendrimer with 4 primary amino groups, DAB-Am-8 is a generation 2 polypropylenimine octaamine dendrimer with 8 primary amino groups, DAB-Am-16 is a generation 3 polypropylenimine hexadecaamine with 16 primary amino groups, DAB-Am-32 is a generation 4 polypropylenimine dotriacontaamine dendrimer with 32 primary amino groups, and DAB-Am-64 is a generation 5 polypropylenimine tetrahexacontaamine dendrimer with 64 primary amino groups.

Often, articles prepared by attaching a previously prepared dendrimeric material to a substrate have fewer reactive end groups than articles with dendrimeric material prepared by a series of stepwise reactions from the substrate surface. There may be steric constraints that limit the number of previously prepared dendrimeric materials that can be attached to a substrate.

The first step in Reaction Scheme A is a ring-opening reaction of an azlactone group that is covalently bonded to the surface of a substrate. The substrate with azlactone groups on its surface (i.e., an azlactone-functional substrate) can be in the form of beads, membranes, films, coatings on a solid support, and the like. Azlactone-functional substrates and methods of making such substrates are described in U.S. Pat. No. 5,336,742 (Heilmann et al.); U.S. Pat. No. 5,403,902 (Heilmann et al.); U.S. Pat. No. 5,344,701 (Gagnon et al.); U.S. Pat. No. 5,993,935 (Rasmussen et al.); U.S. Pat. No. 6,063,484 (Exsted et al.); U.S. Pat. No. 5,292,514 (Capecchi et al.); U.S. Pat. No. 6,548,607 (Halverson et al.); U.S. Pat. No. 5,408,002 (Coleman et al.); U.S. Pat. No. 5,476,665 (Dennison); U.S. Pat. No. 5,510,421 (Dennison et al.); and U.S. Pat. No. 6,794,458 (Haddad et al.), the disclosures of which are all incorporated herein by reference in their entirety.

Suitable azlactone-functional substrates can be prepared using a variety of methods. In some methods, the azlactone-functional substrate can be prepared using reverse phase suspension polymerization, a technique in which the polymerization reaction occurs in water droplets suspended in the suspending medium. The suspending medium is water immiscible and the monomers are water-soluble.

In one reverse phase polymerization process, the polymerization medium includes at least one alkenyl azlactone and at least one crosslinking monomer in a water miscible cosolvent. The amount of crosslinking affects polymeric properties such as the porosity and the degree of swelling in a solvent. Suitable alkenyl azlactone monomers include, but are not limited to, 2-vinyl-4,4-dimethyl-2-oxazolin-5-one which is commercially available from SNPE, Inc., Princeton, N.J.; 2-isopropenyl-4,4-dimethyl-2-oxazolin-5-one; and 2-vinyl-4,4-dimethyl-1,3-oxazin-6-one. Suitable crosslinking agents include, but are not limited to, ethylenically unsaturated ($\alpha,\beta$-unsaturated) esters such as ethylene diacrylate, ethylene dimethacrylate, trimethylolpropane triacrylate, and trimethylolpropane trimethacrylate; and ethylenically unsaturated amides such as methylenebis(acrylamide), methylenebis (methacrylamide), N,N'-diacrylolyl-1,2-diaminoethane, and N,N'-dimethacrylolyl-1,2-diaminoethane. Additionally, the polymerization medium can include other monomers that are water soluble and that can be polymerized using a free radical addition polymerization reaction. Suitable optional monomers include, for example, N,N-dimethylacrylamide and N-vinylpyrrolidone. This polymerization process is further described in U.S. Pat. No. 5,403,902 (Heilmann et al.) and U.S. Pat. No. 5,336,742 (Heilmann et al.)

In another reverse phase polymerization process, a two-step polymerization is used to prepare azlactone-functional substrates. In a first step, a polymeric material with carboxylic functional groups are prepared. The carboxylic functional groups are subsequently reacted with a cyclization agent to form azlactone groups. The polymerization medium includes a water-soluble salt of a N-(meth)acryloylamino acid, a crosslinking monomer, and a water immiscible suspending medium. Additionally, the polymerization medium can include other monomers that are water soluble and that can be polymerized using a free radical addition polymerization reaction. Suitable optional monomers include, for example, N,N-dimethylacrylamide and N-vinylpyrrolidone. Suitable cyclization agents include, for example, acetic anhydride, trifluoroacetic anhydride, and alkyl chloroformates. This process is further described in U.S. Pat. No. 5,403,902 (Heilmann et al.) and U.S. Pat. No. 5,336,742 (Heilmann et al.).

In other methods, the azlactone-functional substrate can be prepared using dispersion polymerization, a technique in which a dispersing medium is chosen that will dissolve the monomers but that will precipitate the polymer as it forms. Various surfactants can be added to prevent aggregation of the polymer particles. For example, the azlactone-functional substrate can be prepared using a dispersion polymerization process in which the polymerization medium includes a 2-alkenyl azlactone monomer, a crosslinking monomer, and at least one surfactant in an organic solvent such as an alcohol. This process in further described in U.S. Pat. No. 5,403,902 (Heilmann et al.) and U.S. Pat. No. 5,336,742 (Heilmann et al.).

The polymeric azlactone-functional substrate can be a gel-type or macroporous polymeric material. As used herein, the term "gel-type" refers to a polymeric material that is prepared with less than 20 weight percent crosslinker based on the weight of monomers in the polymerization medium. As used herein, the term "macroporous" refers to a polymeric material that is prepared with at least 20 weight percent crosslinker based on the weight of monomers in the polymerization medium. A gel-type material tends to swell more and tends to be less rigid than macroporous materials.

In some embodiments, the substrate is the form of a bead. The beads can have a spherical shape, regular shape, or irregular shape. Beads can be prepared using either reverse phase suspension polymerization techniques or dispersion polymerization techniques. Beads that are prepared using reverse phase suspension polymerization techniques tend to be more porous, to have larger surface areas, and to have a higher density of reactive groups compared to beads that are prepared using dispersion polymerization techniques. Beads prepared using dispersion polymerization techniques are generally smaller in size and are less porous (e.g., in some cases the beads can be substantially nonporous) than beads that are prepared using reverse phase suspension polymerization techniques.

The size of the beads can vary depending on the particular application. Generally, the average diameter of the beads is in the range of 0.1 micrometers to 5 millimeters. Some exemplary beads have an average diameter of 0.1 to 1,000 micrometers, 0.1 to 500 micrometers, 0.1 to 100 micrometers, 0.5 to 100 micrometers, 0.1 to 50 micrometers, 0.1 to 20 micrometers, 0.1 to 3 micrometers, or 0.5 to 3 micrometers.

Azlactone functional beads are commercially available under the trade designation "EMPHAZE" from 3M Company, St. Paul, Minn.

In some methods of making an azlactone-functional substrate, the substrate is in the form of a composite membrane that includes azlactone-functional particles (e.g., beads) dispersed in a continuous, porous matrix. Such composite membranes are further described in U.S. Pat. No. 5,993,935 (Rasmussen et al.). The azlactone-functional particles included in the composite membrane can be the beads described above. Alternatively, the azlactone-functional particles included in the membranes can be inorganic particles modified with a coating composition to provide a surface with azlactone groups. The inorganic particles can contain metals or metal oxides; ceramic materials such as alumina, silica, or zirconia; glass (e.g., beads or bubbles); controlled pore glass, and the like. These particles can be modified by coating the particles with a polymer that contains reactive azlactone functional groups or by reacting groups on the surface of the particles with a reagent that contains a reactive functional group (e.g., a coupling agent that has an alkoxy silane for reacting with the surface of the organic particle and that also contains a azlactone group).

Useful continuous, porous matrices for the composite membrane include, but are not limited to, woven and non-woven fibrous webs or porous fibers. Exemplary fibrous materials include those fabricated from polyolefins (e.g., polyethylene and polypropylene), polyvinyl chloride, polyamides (e.g., nylons), polystyrenes, polysulfones, polyvinyl alcohol, polybutylene, ethyl vinyl acetate, polyacrylates such as polymethyl methacrylate, polycarbonate, cellulosics (e.g., cellulose acetate), polyesters (e.g., polyethylene terephthalate), polyimides, and polyurethanes (e.g., polyether polyurethanes), and combinations thereof.

In another method of preparing a composite membrane, azlactone-functional particles are dispersed in a liquid to form a colloidal suspension. A thermoplastic polymer is melt blended with the colloidal suspension at a temperature sufficient to form a homogenous solution. The solution can be formed into a desired shape and then cooled to induce phase separation of the liquid from the polymeric material and solidify the polymeric material. After removal of the liquid, the azlactone-functional particles are dispersed in a microporous polymer matrix. This method is described in detail in U.S. Pat. No. 4,957,943 (McAllister et al.), incorporated herein by reference.

The composite membranes can also be prepared from a porous fibrillated polymer matrix such as fibrillated polytetrafluoroethylene (PTFE). The azlactone-functional particles can be blended with a PTFE dispersion to obtain a putty-like mass. The putty-like mass can then be mixed at a temperature between 5° C. and 100° C. to cause fibrillation of the PTFE and biaxially calendered to form a sheet. The sheet can be dried to remove any solvent. Such methods of making membranes are further described in U.S. Pat. No. 4,153,661 (Ree et al.); U.S. Pat. No. 4,565,663 (Errede et al.); U.S. Pat. No. 4,810,381 (Hagen et al.); and U.S. Pat. No. 4,971,736 (Hagen et al.), incorporated herein by reference.

Yet another method of making a composite membrane is described in U.S. Pat. No. 4,539,256 (Shipman), incorporated herein by reference. Azlactone-functional particles can be dispersed in a polyolefin by heating and stirring. The resulting molten mixture is cast onto a heated plate, subjected to pressure, and then cooled in ice water.

Additionally, composite membranes can also be formed using solvent phase inversion techniques as described in U.S. Pat. No. 5,476,665 (Dennison). An azlactone-functional copolymer and optional blending polymers are introduced into a vessel containing a solvent capable of dissolving the polymers, casting the solution into a desired shape, and introducing the cast solution to a coagulation bath of a liquid that is miscible with the solvent but in which the polymers precipitate to form an azlactone-functional membrane.

Azlactone-functional substrates can also be formed from polymer blends as described in U.S. Pat. No. 5,408,002 (Coleman et al.) and U.S. Pat. No. 6,063,484 (Exsted et al.). Azlactone-functional homopolymers prepared from 2-alkenyl azlactone can be melt blended with thermoplastic polymers. Suitable thermoplastics include polyamides (e.g., nylon 6), polyurethanes, polyacrylates, polymethacrylates, polystyrene, polyolefins, ethylene vinyl acetate copolymers, poly(N-vinyl lactams) (e.g., polyvinyl pyrrolidone), polyvinyl acetate, polyoxyalkylene oxides, fluroelastomers, polycarbonates, polyesters, and the like.

Another method of preparing azlactone-functionalize substrates is described in U.S. Pat. No. 6,063,484 (Exsted et al.). A polyolefin resin is mixed with a free radical initiator (e.g., a peroxide or azo compound) and then heated in an extruder at a temperature sufficient to generate free radicals. A 2-alkenyl azlactone is injected into the extruder to form a grafted azlactone thermoplastic composition. This composition is then formed into a membrane.

Alternatively, azlactone-functional substrates can be formed using solvent phase inversion of azlactone-functional polymer as described in U.S. Pat. No. 5,510,421 (Dennison et al.), incorporated herein by reference. Azlactone-functional compositions, and optionally blending polymers, are placed in a vessel containing a solvent capable of dissolving them. The solution is then cast into a suitable shape, which is then introduced into a coagulation bath of a liquid miscible with the solvent but that causes the precipitation of an azlactone-functional membrane.

An azlactone-functional substrate can also be prepared by applying a coating composition to a solid support. In some embodiments, the coating composition can include a soluble polymer having azlactone groups (e.g., a polymer formed by free radical polymerization of an alkenyl azlactone monomer) and a crosslinking agent. The coating composition can be applied to the solid support using techniques such as extrusion coating, die coating, dip coating, air-knife coating, gravure coating, curtain coating, spray coating, and the like. This process is further described in U.S. Pat. No. 6,794,458 (Haddad et al.). In other embodiments, a surface of a solid support is coated with a coating composition that includes azlactone-functional monomers and crosslinking monomers. The coating composition is polymerized to form an azlactone-functional surface layer on the solid support. This embodiment is further described in U.S. Pat. No. 5,344,701 (Gagnon et al.).

Exemplary solid supports can be prepared from metal, metal oxide or hydroxide, polymeric material, glass, ceramic material, or a combination thereof. The solid support can have any desired shape or size. For example, the supports can be films, particles, fibers, woven or nonwoven webs, membranes, molded plastic articles, and the like.

In some examples, there is sufficient adhesion of the coating composition containing the soluble polymer having azlactone groups to the surface of the solid support. With other solid supports, the adhesion can be enhanced by various pretreatments such as plasma or corona treatment of the solid support or by using a primer layer between the solid support and the coating composition.

Azlactone functional substrates are commercially available from 3M Company, St. Paul, Minn. under the trade designation "EMPORE AFFINITY AZ". Products include, for example, 96 well plates, spin columns, and membranes.

In another method, an article is prepared by providing a substrate having attached nucleophilic groups selected from hydroxyl groups, primary amino groups, secondary amino groups, or a combination thereof; reacting the nucleophilic group attached to the substrate with a first azlactone compound having multiple azlactone groups to form a substrate-attached azlactone compound having at least one azlactone end group; and then reacting the azlactone end group of the substrate-attached azlactone compound with a first nucleophilic compound having multiple nucleophilic groups selected from a hydroxyl group, primary amino group, secondary amino group, or a combination thereof to form a first dendrimeric structure having nucleophilic end groups. To form a dendrimeric structure, the first azlactone compound has at least 3 azlactone groups, the first nucleophilic compound has at least 3 nucleophilic groups, or a combination thereof.

Examples of substrates having attached primary or secondary amino groups include, but are not limited to, polypeptides (e.g., poly-L-lysine), polyamines, polyamides, amine-substituted esters of polymethacrylate, amine-substituted esters of polyacrylate, polyethylene imines, or poly(allyamine).

Other examples of substrates having attached primary or secondary amino groups include substrates with an attached coupling agent. That is, the coupling agent can have a first functional group capable of reacting with the substrate and a second functional group that is a primary or secondary amino group. Examples of such coupling agents include compounds having a first group selected from a halosilyl, alkoxysilyl, or acyloxysilyl and a second group that is a primary or secondary amino group. The halosilyl, alkoxysilyl, or acyloxysilyl groups can react, for example, with the surface of a glass, ceramic, or metal oxide-containing substrate.

Examples of substrate materials having attached hydroxyl groups include, but are not limited to, polyvinyl alcohol, hydroxyl substituted esters of polymethacrylates, hydroxyl substituted esters of polyacrylates, corona-treated polyethylene, and a polyvinyl alcohol coating on a support material such as glass or a polymeric film.

In this aspect of the invention, a dendrimeric structure can be formed using Reaction Scheme B.

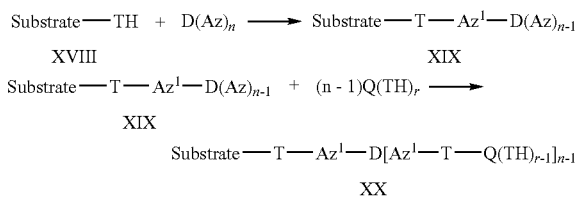

where Substrate-TH (Formula XVIII) denotes a substrate with an attached nucleophilic group selected from a hydroxy group, primary amino group, secondary amino group, or a combination thereof and $D(Az)_n$ denotes a first azlactone compound having at least 2 azlactone groups (i.e. n is an integer equal to or greater than 2) to form a substrate-attached azlactone compound with n−1 azlactone end groups (i.e., Formula XIX). The groups T, Az, $Az^1$, and D are the same as described above. The attachment group is the divalent moiety T. The substrate-attached azlactone compound of Formula XIX is reacted with a first nucleophilic compound of formula $Q(TH)_r$ to form a first dendrimeric structure of formula XX. To provide a dendrimeric structure, at least one of the first azlactone compound or the first nucleophilic compound has at least 3 reactive groups.

Formula XXI depicts an article prepared by reacting a substrate having an attached nucleophilic group with a azlactone compound of formula $D(Az)_3$ and then a nucleophilic compound of formula $Q(TH)_3$ according to Reaction Scheme B.

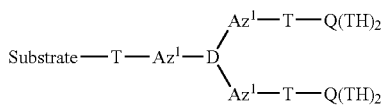

Formula XXI

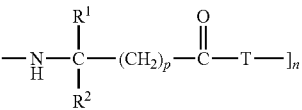

XXV

A second dendrimeric structure with azlactone end groups can be formed by reacting a first dendrimeric structure (e.g., Formulas XX or XXI) having nucleophilic end groups with a second azlactone compound $D^1(Az)_n$ where n is an integer equal to or greater than 2. A third dendrimeric structure with nucleophilic end groups can be formed by reacting a second dendrimeric structure having azlactone end groups with a second nucleophilic compound $Q^1(TH)_r$ where r is an integer equal to or greater than 2. The dendrimeric structure can be further extended by successive reactions of nucleophilic end groups with an azlactone compound having multiple azlactone groups and reactions of the resulting azlactone end groups with a nucleophilic compound having multiple nucleophilic groups. The use of a nucleophilic compound or an azlactone compound with two reactive groups extends the dendrimeric structure while the use of a nucleophilic compound or an azlactone compound with at least three reactive groups results in a dendrimeric structure that has an increased length and increased branching.

Alternatively, a dendrimeric structure having azlactone end groups (i.e., the second dendrimeric structure or a fourth dendrimeric structure with azlactone end groups) can be extended by reaction with a multi-functional compound of formula $M(TH)_x(G)_y$ as defined above. Such an extended dendrimeric structure will have at least one acidic end group.

As another alternative, a dendrimeric structure having azlactone end groups can be reacted with an end capping compound of formula J(TH) where J(TH) is the same as described above. The nucleophilic group on the end capping compound can react with the azlactone end group of the dendrimeric structure.

In yet another aspect, an article is prepared by providing an azlactone-functional substrate and then reacting an azlactone group on the substrate with a dendrimeric material having at least one nucleophilic group to form a first dendrimeric structure. The azlactone-functional substrate is according to Formula III.

Any dendrimeric material having nucleophilic groups can be used. In some embodiments, the dendrimeric material has primary amino end groups such as those prepared from polyamidoamine (e.g., "STARBURST (PAMAM) DENDRIMER" from Aldrich Chemical, Milwaukee, Wis.) and polypropylenimine (e.g., "DAB-AM" from Aldrich Chemical).

Articles

Various articles are provided, some of which are exemplified by the dendrimeric structures according to Formulas X to XVII, XX, and XXI above. The articles include a substrate, a dendrimeric material, and an attachment group for connecting the dendrimeric material to the substrate.

In some articles, the dendrimeric material includes at least one extension group of Formula XXV where p is an integer of 0 or 1; n is an integer of at least 2; $R^1$ and $R^2$ are independently are selected from an alkyl, heteroalkyl, aryl, aralkyl, or $R^1$ and $R^2$ taken together with a carbon atom to which they are attached form a carbocyclic ring; T is oxy or $NR^b$ where $R^b$ is selected from hydrogen, an alkyl, heteroalkyl, aryl, or aralkyl; and D is a linking group with a valence equal to n and that contains at least 1 carbon atom.

In some embodiments of Formula XXV, an alkyl group has 1 to 18 carbon atoms, 1 to 12 carbon atoms, 3 to 12 carbon atoms, 1 to 10 carbon atoms, 3 to 10 carbon atoms, 1 to 6 carbon atoms, 3 to 6 carbon atoms, or 1 to 4 carbon atoms; a heteroalkyl group has 2 to 18 carbon atoms and 1 to 6 heteroatoms, 2 to 12 carbon atoms and 1 to 5 heteroatoms, 2 to 10 carbon atoms, and 1 to 4 heteroatoms, 2 to 8 carbon atoms and 1 to 3 heteroatoms, or 2 to 6 heteroatoms and 1 to 2 heteroatoms; an aryl group has 2 to 12 carbon atoms and 0 to 3 heteroatoms, 3 to 12 carbon atoms and 0 to 2 heteroatoms, or 4 to 12 carbon atoms and 0 to 1 heteroatoms; an aralkyl group has 3 to 15 carbon atoms and 0 to 3 heteroatoms, 4 to 15 carbon atoms and 0 to 2 heteroatoms, or 5 to 15 carbon atoms and 0 to 1 heteroatom; and a carbocyclic ring has 5 to 12 carbon atoms, 5 to 10 carbon atoms, or 5 to 8 carbon atoms. Suitable heteroatoms include O, S, or $NR^b$ where $R^b$ is hydrogen, alkyl, heteroalkyl, aryl, or aralkyl.

In some exemplary extension groups according to Formula XXV, p is equal to 0 and both $R^1$ and $R^2$ are alkyl groups. In more specific examples, p is equal to 0 and both $R^1$ and $R^2$ are methyl groups. In some even more specific examples, p is equal to 0, n is an integer of 2 to 4, and both $R^1$ and $R^2$ are methyl groups.

The linking group D has at least one carbon atom and has a valence equal to n. In some embodiments, the valence of D is 2 to 6, 2 to 4, 3, or 2. If the extension group is also a branching group, then n is equal to at least 3. In some embodiments, linking group D has at least 2, at least 4, or at least 6 carbon atoms. Suitable trivalent and tetravalent linking groups D include, but are not limited to, the following structures:

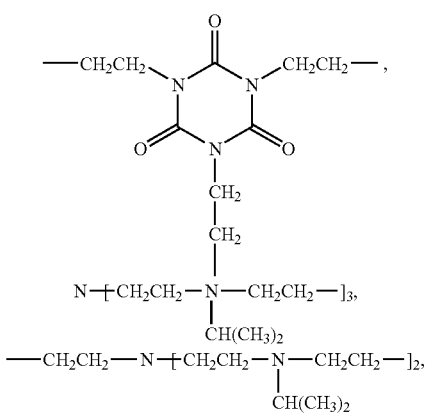

-continued

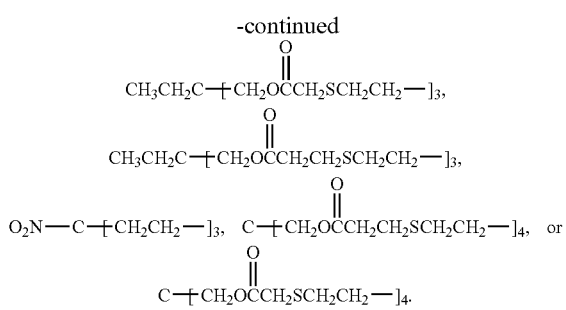

In some dendrimeric structures, there are at least two extension groups, at least three extension groups, or at least four extension groups of Formula XXV between the end groups and the attachment group. At least some of the extension groups are branching groups. Formulas XII to XVII, XX, and XXI have at least one extension group according to Formula XXV.

The end groups of the dendrimeric structure are generally an azlactone group, a primary amino group, a secondary amino group, a hydroxy group, or an acidic group (e.g., —COOH, —SO$_3$H, —(P=O)(OH)$_2$), a salt of an acidic group, or a combination thereof.

In another aspect, an article is provided that include a substrate, a dendrimeric material, and an attachment group that is of Formula II

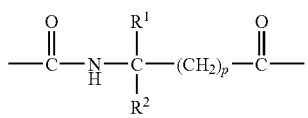

wherein p is an integer of 0 or 1; and R$^1$ and R$^2$ independently are selected from an alkyl, heteroalkyl, aryl, aralkyl, or R$^1$ and R$^2$ taken together with a carbon atom to which they are attached form a carbocyclic ring.

Any dendrimeric material that has at least one nucleophilic group capable of reacting with an azlactone ring can be attached to the substrate through an attachment group of Formula II. That is, reacting a nucleophilic group on the dendrimeric material with an azlactone-functional substrate can result in the formation of an attachment group according to Formula II. In some embodiments, the dendrimeric material can have an extension group such as that depicted in Formula XXV.

Dendrimeric structures that have amino or acidic end groups can be used for ion exchange reactions. For example, the articles (i.e., dendrimeric structure) can be in the form of beads suitable for use as an anion exchange resin or as a cation exchange resin. An anion exchange resin has positively charged groups and can interact with negatively charged material (i.e., anions) in a sample. Beads with an attached dendrimeric material with amino end groups can be used as an anion exchange resin. A cation exchange resin has negatively charged groups and can interact with positively charged material (i.e., cations) in a sample. Beads with an attached dendrimeric material with acid end groups can be used as a cation exchange resin.

A sample containing negatively charged materials can be contacted with an anion exchange resin at a pH where the anion exchange resin has positively charged groups (e.g., at a pH of 2 to 7). To release the adsorbed material from the anion exchange resin, the pH can be raised to at least 8 (e.g., the pH can be 10 to 12). Alternatively, when the charged material is a biomolecule, the sample can be contacted with the anion exchange resin in a low ionic strength buffer (e.g., a 5 to 20 millimolar buffer salt) at a pH of about 3 to 10 or at a pH of about 6-8. To release the adsorbed biomolecule, a high ionic strength buffer is contacted with the anion exchange resin. In some embodiments, the high ionic strength buffer includes that same buffer composition used to adsorb the material plus 1 molar sodium chloride. The adsorption and release processes are typically performed at temperatures near room temperature.

The sample containing positively charged materials is usually contacted with a cation exchange resin at a pH where the cation exchange resin has negatively charged groups (e.g., at a pH of 7 to 12). To release the adsorbed material from the cation exchange resin, the pH can be lowered to at least 6 (e.g., the pH can be 2 to 5). Alternatively, when the charged material is a biomolecule, the sample can be contacted with the anion exchange resin in a low ionic strength buffer (e.g., 5 to 20 millimolar buffer salt) at a pH of about 3 to 10 or at a pH of about 6-8. To release the adsorbed biomolecule, a high ionic strength buffer is contacted with the cation exchange resin. In some embodiments, the high ionic strength buffer includes that same buffer composition used to adsorb the material plus 1 molar sodium chloride. The adsorption and release processes are typically performed at temperatures near room temperature.

Buffer salts useful for controlling pH include, but are not limited to, sodium phosphate, sodium carbonate, sodium bicarbonate, sodium borate, sodium acetate, and TRIS (tris (hydroxymethyl)aminomethane). Other suitable buffers include "Good's" buffers such as MOPS (3-morpholinopropanesulfonic acid), EPPS (4-(2-hydroxyethyl)piperazine-1-propanesulfonic acid), MES (2-morpholinoethanesulfonic acid), and others.

Some samples include a biomolecule or a pharmaceutical compound. The biomolecule can be separated from the other sample constituents or can be purified. Suitable biomolecules include, for example, proteins, enzymes, vaccines, DNA, and RNA. Adjusting the pH of the sample can alter the charge of some biomolecules.

Beads having an attached dendrimeric material with azlactone end groups can be used as affinity capture sites. For example, ligands can be covalently attached by nucleophilic ring-opening reaction with the azlactone end groups. These ligands are generally biologically active compounds (i.e., they are substances which are biologically, immunochemically, physiologically, or pharmaceutically active) and, as such, can be used to separate or purify biological compounds that interact with them. Examples of biologically active substances include proteins, peptides, polypeptides, antibodies, antigenic substances, enzymes, cofactors, inhibitors, lectins, hormones, receptors, coagulation factors, aminoacids, histones, vitamins, drugs, and cell surface markers. A particularly useful ligand is Protein A, which can be used to separate and purify antibodies for use as protein therapeutics.

Beads with attached dendrimeric materials can be placed in a chromatographic column. Suitable columns are known in the art and can be constructed of such materials as glass, polymeric material, stainless steel, titanium and alloys thereof, or nickel and alloys thereof. The chromatographic columns can be part of an analytical instrument such as a liquid chromatograph. When packed with the ion exchange resin, the chromatographic column can be used to separate an ionic material from non-ionic materials or to separate one ionic material from another ionic material with a different charge density. The amount of the ionic material in the sample can be determined.

The chromatographic columns can be part of a preparative liquid chromatographic system to separate or purify at least one compound in a sample that contains a mixture of compounds. The preparative liquid chromatographic system can be a laboratory scale system, a pilot plant scale system, or an industrial scale system. Some liquid chromatographic systems are capable of recycling the sample through the chromatographic column to increase the amount of material retained by the column.

Beads with attached dendrimeric material can be disposed on the surface of a filtration medium. Suitable filtration medium and systems that include a filter cartridge containing the filtration medium are described, for example, in U.S. Pat. No. 5,468,847 (Heilmann et al.), incorporated herein by reference. Such a filter cartridge can be used, for example, to purify or separate biomolecules.

The filtration medium can have a single filtration layer or multiple filtration layers. The filtration medium can be prepared from glass or polymeric fibers (e.g., polyolefin fibers such as polypropylene fibers). In some embodiments, the filtration medium includes a coarse pre-filtration layer and one or more finer filtration layers. For example, the filtration medium can include a coarse pre-filtration layer and then a series of additional filtration layers with progressively smaller average pore sizes. The ion exchange resin can be positioned on the layer of the filtration medium having the smallest average pore size.

Selection of the pore size of the filtration medium depends on the size of the ion exchange resin. Typically the pore size of the filtration medium is selected to be smaller than the average diameter of the ion exchange resin. However, a portion of the ion exchange resin can penetrate into the filtration medium.

The filtration medium can be in the form of vertical pleated filters such as those described in U.S. Pat. No. 3,058,594. In other embodiments, the filtration medium is in the form of horizontal, compound radially pleated filters such as those described in U.S. Pat. No. 4,842,739 (Tang et al.), incorporated herein by reference. A horizontal arrangement of the pleats can be desirable in applications where a filter cartridge containing the filtration medium is used in the vertical direction. Such an arrangement can reduce the loss of the ion exchange resin from the filter element during use and storage.

Beads having an attached dendrimeric material with azlactone end groups can also be used as reagent scavenging sites. For example, the beads can be used to separate compounds having nucleophilic groups that can react with the azlactone end group. In combinatorial chemistry synthesis, excess reagents are often utilized to increase yields and reaction rates. Excess primary or secondary amine containing reagents could be removed from a reaction mixture using the above beads.

Other exemplary articles are in the form of a composite material that includes a continuous, porous matrix and a bead incorporated within the porous matrix. The bead has an attached dendrimeric material. The continuous, porous matrix is typically a woven or non-woven fibrous web, porous fiber, porous membrane, porous film, hollow fiber, or tube. Methods of making such an article are described above. Still other exemplary articles include films with attached dendrimeric material or coatings that have attached dendrimeric material. As with the beads described above, these articles can be used for the purification and/or separation of at least one compound form a mixture of compounds.

The foregoing describes the invention in terms of embodiments foreseen by the inventor for which an enabling description was available, notwithstanding that insubstantial modifications of the invention, not presently foreseen, may nonetheless represent equivalents thereto.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Aldrich Chemical Company; Milwaukee, Wis. unless otherwise noted.

Test Methods

Anion Exchange Capacity

The following procedure was used to determine the anion exchange capacity. A 0.8×4 centimeter polypropylene disposable chromatography column (Poly-Prep Column, Bio-Rad Laboratories, Hercules, Calif.) was packed with 1 mL of beads with an attached material such as a dendrimeric structure having amino end groups. The column bed was equilibrated by washing with 10 mL of loading buffer, 10 mM MOPS (4-morpholinopropanesulfonic acid)/pH 7.5, then loaded with 10 mL of protein solution (20 mg/ml, bovine serum albumin BSA, fraction V, 96-99% purity, Sigma Chemical Co.), collecting the flow through fraction. Unbound BSA was washed off with 30 mL of the MOPS buffer (three 10 mL fractions). Finally, bound protein was eluted with 15 mL of 1 M NaCl in MOPS buffer. Protein recovered in the various fractions was determined by measuring the UV absorbance at 280 nm using a Hewlett-Packard Diode Array Spectrophotometer, Model 8452A, and compared to a standard curve prepared using pure BSA (Albumin Standard, Pierce Chemical Co., Rockford, Ill.). The amount of protein recovered in the NaCl eluate was equated to the anion exchange capacity for the support.

| Table of Abbreviations | |
|---|---|
| Abbreviation or Trade Designation | Description |
| VDM | 4,4-dimethyl-2-vinyl-1,3-oxazolin-5-one (vinyldimethylazlactone) |
| ED | ethylenediamine |
| TREN | Tris(2-aminoethyl)amine |
| TRIZ | Tris-azlactone prepared by Michael addition of VDM to TITREN as described in Example 2c of U.S. Pat. No. 5,292,514. The structure of TRIZ is $$N\!-\!\!\!+\!CH_2CH_2\!-\!\underset{\underset{CH(CH_3)_2}{|}}{N}\!-\!CH_2CH_2\!-\!Az]_3.$$ |
| STARBURST | Amine-functional dendrimer commercially available from Aldrich Chemical Company, Milwaukee, WI. |
| TITREN | N,N',N''-Tris(isopropyl) TREN |
| BSA | bovine serum albumin. |
| Azlactone-functional beads | 140 microns average size beads that were prepared as described in U.S. Pat. No. 5,336,742 |
| TRIS | Tris-azlactone prepared by reaction of VDM with cyanuric acid according to the teachings of U.S. Pat. No. 5,268,473. The structure of TRIS is |

-continued

Table of Abbreviations

| Abbreviation or Trade Designation | Description |
|---|---|
| | ![structure: triazine trione with three CH₂CH₂Az groups] AzCH₂CH₂—N, CH₂CH₂Az on triazine-2,4,6-trione ring with third N-CH₂CH₂Az |
| DITC | p-phenylenediisothiocyanate |
| DMF | di-methyl formamide |
| AMPSO | N-(1,1-dimethyl-2-hydroxyethyl)-3-amino-2-hydroxypropanesulfonic acid |
| SDS | Sodium dodecylsulfate |

Comparative Example C1

Azlactone-functional beads were hydrolyzed by reaction in 0.1 N HCl for 1 hour. The anion exchange capacity was measured according to the procedure described in the Test Methods. The data are shown in Table 1.

Preparative Example 1

A 1 gram sample of azlactone-functional beads was reacted as a slurry with 20 ml of 1.0 Molar ED in deionized water for 30 minutes at room temperature to form Generation 0 amine-functional Beads. Anion exchange capacity was measured according to the procedure described in the Test Methods. These data are presented in Table 1.

Preparative Example 2

A 1 gram sample of azlactone-functional beads was reacted as a slurry with 20 ml of 1.0 Molar TREN in deionized water for 30 minutes at room temperature to form Generation 0 amine-functional Beads. Anion exchange capacity was measured according to the procedure described in the Test Methods. These data are presented in Table 1.

Example 1

A sample of the amine-functional beads of Preparatory Example 1 was reacted as a 50/50 (volume/volume) slurry with TRIZ (1.0 Molar solution in isopropanol, 30 minutes, room temperature). Following reaction, the beads were filtered, washed with three equal volumes of acetone, and dried under vacuum. The resulting azlactone-functional beads were reacted as a 50/50 (volume/volume) slurry with 1.0 Molar ED in deionized water for 30 minutes at room temperature to form Generation 1 amine-functional beads. The anion exchange capacity was measured according to the procedure described in the Test Methods. These data are presented in Table 1.

Example 2

A sample of the amine-functional beads of Preparatory Example 1 was reacted with TRIZ as in Example 1. The resulting azlactone-functional beads were reacted as a 50/50 (volume/volume) slurry with 1.0 Molar TREN in deionized water to form Generation 1 amine-functional beads. Anion exchange capacity was measured according to the procedure described in the Test Methods. These data are presented in Table 1.

Example 3

A sample of the amine-functional beads of Preparatory Example 2 was reacted with TRIZ as in Example 1. The resulting azlactone-functional beads were reacted as a 50/50 (volume/volume) slurry with 1.0 Molar ED in deionized water to form Generation 1 amine-functional beads. Anion exchange capacity was measured according to the procedure described in the Test Methods. These data are presented in Table 1.

Example 4

A sample of the amine-functional beads of Preparatory Example 2 was reacted with TRIZ as in Example 1. The resulting azlactone-functional beads were reacted as a 50/50 (volume/volume) slurry with 1.0 Molar TREN in deionized water to form Generation 1 amine-functional beads. Anion exchange capacity was measured according to the procedure described in the Test Methods. These data are presented in Table 1.

Example 5

A sample of the amine-functional beads of Example 1 was reacted with TRIZ as in Example 1. The resulting azlactone-functional beads were reacted as a 50/50 (volume/volume) slurry with 1.0 Molar ED in deionized water to form Generation 2 amine-functional beads. Anion exchange capacity was measured according to the procedure described in the Test Methods. These data are presented in Table 1.

Example 6

A sample of the amine-functional beads prepared in Example 2 was reacted with TRIZ as in Example 1. The resulting azlactone-functional beads were reacted as a 50/50 (volume/volume) slurry with 1.0 Molar ED in deionized water to form Generation 2 amine-functional beads. Anion exchange capacity was measured according to the procedure described in the Test Methods. These data are presented in Table 1.

Example 7

A sample of the amine-functional beads prepared in Example 3 was reacted with TRIZ as in Example 1. The resulting azlactone-functional beads were reacted as a 50/50 (volume/volume) slurry with 1.0 Molar TREN in deionized water to form Generation 2 amine-functional beads. Anion exchange capacity was measured according to the procedure described in the Test Methods. These data are presented in Table 1.

Example 8

A sample of the amine-functional beads prepared in Example 4 was reacted with TRIZ as in Example 1. The resulting azlactone-functional beads were reacted as a 50/50 (volume/volume) slurry with 1.0 Molar TREN in deionized water to form Generation 2 amine-functional beads. Anion exchange capacity was measured according to the procedure described in the Test Methods. These data are presented in Table 1.

TABLE 1

| Example | Reacted Amine Generation 0 | Reacted Amine Generation 1 | Reacted Amine Generation 2 | Anion exchange capacity for BSA (mg/mL) |
|---|---|---|---|---|
| C1 | NA | NA | NA | 0.3 |
| Prep Ex1 | ED | NA | NA | 19.6 |
| Prep Ex2 | TREN | NA | NA | 39.6 |
| 1 | ED | ED | NA | 40.9 |
| 2 | ED | TREN | NA | 54.5 |
| 3 | TREN | ED | NA | 47.5 |
| 4 | TREN | TREN | NA | 50.4 |
| 5 | ED | ED | ED | 44.9 |
| 6 | ED | TREN | ED | 50.2 |
| 7 | TREN | ED | TREN | 50.5 |
| 8 | TREN | TREN | TREN | 48.2 |

NA = not applicable

Example 9

A 0.1 gram sample of azlactone-functional beads was reacted as a slurry with 2 ml of 20% w/w solution in methanol of PAMAM STARBURST Dendrimer, Generation 0 for 30 minutes at room temperature to form amine-functional beads. Anion exchange capacity was measured according to the procedure described in the Test Methods. These data are presented in Table 2.

Example 10

A 0.1 gram sample of azlactone-functional beads was reacted with PAMAM STARBURST Dendrimer, Generation 1 as in Example 9 to form amine-functional beads. Anion exchange capacity was measured according to the procedure described in the Test Methods. These data are presented in Table 2.

Example 11

A 0.1 gram sample of azlactone-functional beads was reacted with PAMAM STARBURST Dendrimer, Generation 2 as in Example 9 to form amine-functional beads. Anion exchange capacity was measured according to the procedure described in the Test Methods. These data are presented in Table 2.

TABLE 2

| Example | Anion exchange capacity for BSA (mg/mL) |
|---|---|
| 9 | 15.7 |
| 10 | 23.4 |
| 11 | 49.4 |

Examples 12-14

Generation 1 azlactone-functional beads prepared according to Example 1 were reacted with Generation 0, 1, or 2 PAMAM Dendrimers as described in Examples 9-11, respectively. The resultant amine-functional beads were assayed for anion exchange capacity as described in the Test Methods. These data are reported in Table 3.

Examples 15-17

Generation 2 azlactone-functional beads prepared according to Example 3 were reacted with Generation 0, 1, or 2 PAMAM Dendrimers as described in Examples 9-11, respectively. The resultant amine-functional beads were assayed for anion exchange capacity as described in the Test Methods. These data are reported in Table 3.

TABLE 3

| Example | Anion exchange capacity for BSA (mg/mL) |
|---|---|
| 12 | 47.1 |
| 13 | 53.9 |
| 14 | 60.0 |
| 15 | 52.9 |
| 16 | 56.8 |
| 17 | 59.5 |

Example 18 and Comparative Example C2

For Example 18, a sample of a glass microscope slide having amine-functionality (commercially available as "AMINOSILANE" slides from Newcomer Supply, Middleton, Wis.) was made azlactone-functional by dipping into a 5% w/w solution of TRIS in DMF for 5 minutes at room temperature, rinsing with DMF, and drying at 60° C. for 2 hours. A generation 0 azlactone-functional slide thus prepared was spotted with a solution of fluorescein cadverine (commercially available from Molecular Probes, Eugene, Oreg.; 25 µg/ml) in 1.0 Molar sodium sulfate/50 milliMolar AMPSO with a pH of 9.5, allowed to react for 1 hour, washed with deionized water, buffer solution, 1% SDS solution and deionized water.

For Comparative Example C2, the same procedure was followed except that the glass microscope slide was dipped into a solution of DITC in DMF. The slides were evaluated with a fluorescence scanning device to measure the average fluorescence intensity of the spots (reported as relative light units RLU). These data are shown in Table 3.

Example 19

A sample of a glass microscope slide having amine-functionality (commercially available from Newcomer Supply, Middleton, Wis.) was made azlactone-functional by the procedure of Example 18. The slide thus prepared was dipped into a solution of 1.0 Molar TREN in deionized water for 5 minutes at room temperature to form an amine-functional slide. This slide was made azlactone-functional by dipping into a solution of TRIS in DMF, rinsing with DMF, and drying as before. A second round of derivatization with TREN and TRIS was conducted to produce a dendrimeric generation 2 azlactone-functional slide. A slide thus prepared was spotted with a solution of fluorescein cadverine and evaluated as in Example 18. These data are presented in Table 4.

TABLE 4

| Example | Fluorescence Intensity (RLU) |
|---------|------------------------------|
| 18      | 512                          |
| C2      | 284                          |
| 19      | 722                          |

Examples 20-22

The procedures of Examples 18 and 19 were repeated using "Poly-L-lysine" coated slides from Newcomer Supply, Middleton, Wis., to produce generation 0, 1, and 2 azlactone-functional slides. These slides were spotted with fluorescein cadaverine solutions and evaluated as in Example 18. These data are reported in Table 5.

TABLE 5

| Example | Fluorescence Intensity (RLU) |
|---------|------------------------------|
| 20      | 373                          |
| 21      | 861                          |
| 22      | 1133                         |

We claim:

1. An article comprising:
   a) a substrate;
   b) an attachment group connecting a dendrimeric material to the substrate; and
   c) a dendrimeric material comprising an extension group having a valence equal to an integer of 2 to 6, said extension group being of Formula XXV

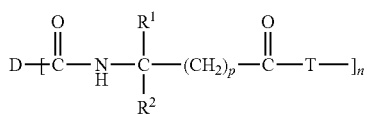

XXV wherein
   n is an integer of at least 2;
   p is an integer of 0 or 1;
   T is oxy or $NR^b$ where $R^b$ is selected from hydrogen, alkyl, heteroalkyl, aryl, or aralkyl;
   $R^1$ and $R^2$ independently are selected from an alkyl, heteroalkyl, aryl, aralkyl, or $R^1$ and $R^2$ taken together with a carbon atom to which they are attached form a carbocyclic ring; and
   D is a linking group with a valence equal to n that contains at least one carbon atom.

2. The article of claim 1, wherein p is 0 and n is 3.

3. The article of claim 1, wherein $R^1$ and $R^2$ are both alkyl groups having 1 to 4 carbon atoms.

4. The article of claim 1, wherein the dendrimeric structure has nucleophilic end groups selected from hydroxyl groups, primary amino groups, secondary amino groups, or a combination thereof.

5. The article of claim 1, wherein the dendrimeric structure has azlactone end groups.

6. The article of claim 1, wherein the dendrimeric structure has acidic end groups.

7. The article of claim 1, wherein the attachment group is a divalent group of Formula II

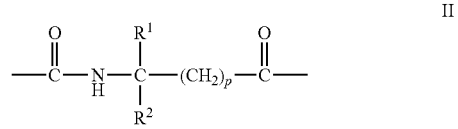

II wherein
   p is an integer of 0 or 1; and
   $R^1$ and $R^2$ independently are selected from an alkyl, heteroalkyl, aryl, aralkyl, or $R^1$ and $R^2$ taken together with a carbon atom to which they are attached form a carbocyclic ring.

8. The article of claim 1, wherein the attachment group comprises a first group that is attached to the substrate and a second group that is covalently attached to the dendrimer, wherein the second group is selected from thio or —$NR^b$— where $R^b$ is selected from hydrogen, alkyl, heteroalkyl, aryl, or aralkyl.

9. The article of claim 8, wherein the first group comprises the reaction product of an halosilyl, alkoxysilyl, or acyloxysilyl group with the substrate and the second group is —$NR^b$— wherein $R^b$ is hydrogen, alkyl, heteroalkyl, aryl, or aralkyl.

10. The article of claim 1, wherein the attachment group is formed from a polypeptide, polyethylene imine, poly(ally imine), polyvinyl alcohol, hydroxyl substituted esters of polymethacrylates, hydroxyl substituted esters of polyacrylates, or corona-treated polyethylene.

11. The article of claim 1, wherein the substrate comprises a polymeric bead.

12. The article of claim 1, wherein the substrate comprises a film, a membrane, or a coating on a solid support.

13. The article of claim 1, wherein the dendrimeric structure has an attached end capping compound that is a ligand for an anion exchange separation, a ligand for a hydrophobic interaction separation, or as a ligand for an affinity separation.

14. An article comprising:
   a) a substrate;
   b) a dendrimeric material comprising an extension group having a valence equal to an interger of 2 to 6, said extension being of Formula XXV

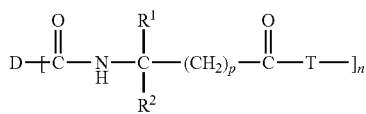

XXV wherein
   n is an integer of at least 2;
   p is an integer of 0 or 1;
   T is oxy or $NR^b$ where $R^b$ is selected from hydrogen, alkyl, heteroalkyl, aryl, or aralkyl;
   $R^1$ and $R^2$ independently are selected from an alkyl, heteroalkyl, aryl, aralkyl, or $R^1$ and $R^2$ taken together with a carbon atom to which they are attached form a carbocyclic ring; and
   D is a linking group with a valence equal to n that contains at least one carbon atom; and c) a divalent attachment group connecting the dendrimeric material to the substrate, said attachment group being of Formula II

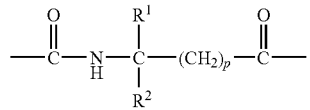

II wherein
p is an integer of 0 or 1; and
$R^1$ and $R^2$ independently are selected from an alkyl, heteroalkyl, aryl, aralkyl, or $R^1$ and $R^2$ taken together with a carbon atom to which they are attached form a carbocyclic ring.

15. The article of claim 14, wherein the dendrimeric material comprises polyamidoamine or polypropylenimine.

* * * * *

UNITED STATES PATENT AND TRADEMARK OFFICE
CERTIFICATE OF CORRECTION

PATENT NO. : 7,556,858 B2
APPLICATION NO. : 10/954862
DATED : July 7, 2009
INVENTOR(S) : Jerald K. Rasmussen It is certified that error appears in the above-identified patent and that said Letters Patent is hereby corrected as shown below:

On the Title Pg, Item (56) (Foreign Patent Documents)
Line 4, delete "WO    WO97/39041    10/1997".

On the Title Pg, Item (56) (Other Publications)
Line 6, delete "Derivatisation" and insert in place thereof -- Derivatization --.

Column 2
Line 23, after "XXV" insert -- . --.

Column 5
Line 28 (approx.), delete "R" and insert in place thereof -- $R^2$ --.

Column 6
Line 17 (approx.), delete "(r-1)(D(Az)$_n$" and insert in place thereof -- (r-1) D(Az)$_n$ --.

Column 8
Line 27, delete "methylpentyl]poly" and insert in place thereof -- methylpentylpoly --.

Line 41, delete "ltriazin" and insert in place thereof -- triazine --.

Lines 42-45, delete "$-\!\!-\!\!N\!\!-\!\![CH_2CH_2\!-\!N\!-\!CH_2CH_2\!-\!Az]_3$ with $CH(CH_3)_2$ branch" and insert in place thereof -- $N\!\!-\!\![CH_2CH_2\!-\!N\!-\!CH_2CH_2\!-\!Az]_3$ with $CH(CH_3)_2$ branch --.

Lines 58-59 (approx.), delete "N,N',N"-tris2-(4,4-dimethyl-2-oxazoline-5-one-2-yl)ethyl" and insert in place thereof -- N,N',N"-tris[2-(4,4-dimethyl-2-oxazoline-5-one-2-yl)ethyl] --.

Column 9
Line 9 (approx.), delete "ethyl carbonyloxymethyl" and insert in place thereof
-- ethylcarbonyloxymethyl --.

Column 11
Line 28, delete "M(TH)(G)" and insert in place thereof -- $M(TH)_x(G)_y$ --.

CERTIFICATE OF CORRECTION (continued)
U.S. Pat. No. 7,556,858 B2

Column 15-16
Lines 1-20 (Structure XVIIb), delete " 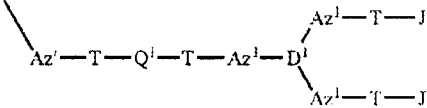 " and insert in place thereof -- 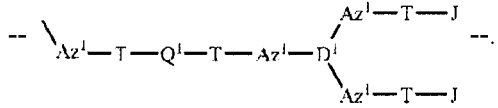 --.

Column 19
Line 5, delete "fluroelastomers" and insert in place thereof -- fluoroelastomers --.

Column 20
Line 13, delete "(allyamine)." and insert in place thereof -- (allylamine). --.

Line 40, delete "(n-1)Q(TH)$_r$" and insert in place thereof -- (n-1) Q(TH)$_r$ --.

Column 30
Line 37, delete "cadverine" and insert in place thereof -- cadaverine --.

Line 66, delete "cadverine" and insert in place thereof -- cadaverine --.

Column 32
Line 25, in Claim 9, delete "an" and insert in place thereof -- a --.

Line 30, in Claim 10, delete "poly(ally" and insert in place thereof -- poly(allyl --.

Line 46, in Claim 14, delete "interger" and insert in place thereof -- integer --.

Line 47, in Claim 14, after "extension" insert -- group --.

Signed and Sealed this

Sixth Day of April, 2010

David J. Kappos
*Director of the United States Patent and Trademark Office*